US012420125B2

(12) United States Patent
Bolshak et al.

(10) Patent No.: US 12,420,125 B2
(45) Date of Patent: Sep. 23, 2025

(54) COMPACT POWDER FIRE-EXTINGUISHING DEVICE

(71) Applicants: Yuriy Nikolaevich Bolshak, Harkovskaya oblast (UA); Vladimir Petrovich Vasilev, g. Nikolaev (UA)

(72) Inventors: Yuriy Nikolaevich Bolshak, Harkovskaya oblast (UA); Vladimir Petrovich Vasilev, g. Nikolaev (UA)

( * ) Notice: Subject to any disclaimer, the term of this patent is extended or adjusted under 35 U.S.C. 154(b) by 935 days.

(21) Appl. No.: 17/423,473

(22) PCT Filed: Jan. 29, 2019

(86) PCT No.: PCT/UA2019/000018
§ 371 (c)(1),
(2) Date: Jul. 15, 2021

(87) PCT Pub. No.: WO2020/036569
PCT Pub. Date: Feb. 20, 2020

(65) Prior Publication Data
US 2022/0118298 A1 Apr. 21, 2022

(51) Int. Cl.
*A62C 17/00* (2006.01)
*A62C 13/00* (2006.01)
*A62C 13/22* (2006.01)

(52) U.S. Cl.
CPC ............ *A62C 13/006* (2013.01); *A62C 13/22* (2013.01); *A62C 17/00* (2013.01)

(58) Field of Classification Search
CPC ...... A62C 13/003; A62C 13/006; A62C 13/22
(Continued)

(56) References Cited

U.S. PATENT DOCUMENTS 1,500,431 A 7/1924 Wolf
2,838,122 A 6/1958 Hutchinson
(Continued)

FOREIGN PATENT DOCUMENTS

EP 693303 A2 * 1/1996 ............. A62C 13/22
EP 1479414 A1 * 11/2004 ........... A62C 13/006

*Primary Examiner* — Jason J Boeckmann
(74) *Attorney, Agent, or Firm* — John Alumit

(57) ABSTRACT

The present compact powder fire-extinguishing device comprises a container containing a fire-extinguishing powder, said container being in the form of a single-use cartridge (1) containing a fire-extinguishing powder (3), said cartridge being separable from the fire-fighting device by means of a reusable fast-action firing device (4), wherein the fire-extinguishing powder (3) is disposed inside of a casing (2) of the cartridge (1) in a polymer tube (5), one end (6) of which is fastened at an outlet of the casing (2) of the cartridge (1), about the periphery of said casing, and the second end of the tube (5) abuts a sleeve (7) and is configured as a piston (8) having an aperture (9). Within the casing (2) of the cartridge (1) are provided means that generate a propulsive charge and are configured as a striker-type igniter-percussion cap (15) and a pyrotechnic gas generator (16) disposed one after the other, said gas generator being connected to the cavity of the sleeve (7), and the other end of the cartridge (1) is provided with a contoured surface (18) and is connected to the firing device (4) that comprises a mechanism for fastening and discharging the cartridge. Furthermore, the firing device (4) is provided with a striker trigger mechanism that comprises a head (30), a flat striking spring (32) having a striker (33), a hammer (38) connected to a trigger (41), and a safety catch (46).

1 Claim, 3 Drawing Sheets

(58) Field of Classification Search
USPC .............................................. 169/33, 36, 77
See application file for complete search history.

(56) References Cited

U.S. PATENT DOCUMENTS

| | | | | |
|---|---|---|---|---|
| 3,889,758 | A | 6/1975 | Dunn | |
| 8,991,511 | B2 * | 3/2015 | Fabre | A62C 35/02 169/33 |
| 2018/0185681 | A1 * | 7/2018 | Marlin | A62C 35/023 |

* cited by examiner

COMPACT POWDER FIRE-EXTINGUISHING DEVICE

FIELD OF THE INVENTION

The utility model relates to the field of fire safety and can be used when manufacturing compact pistol type fire extinguishers.

PRIOR ART

Currently, pulse technology of multi-purpose protection is considered to be one of the promising fire extinguishing methods. One of the important advantages of pulsed fire extinguishing devices is their ability to project and spray any loose, powder, liquid, and viscous compounds in a wide range of temperatures and in any climatic and weather conditions (V. Zakhmatov and A. Pyatova, Pulse Technology—New opportunities in Firefighting. Pozharnoye Delo (1997), 300 p.).

The prior art includes commonly known fire extinguishers with pulsed discharge of a fire extinguishing substance from thin-walled cylindrical bodies using gaseous gunpowder combustion products (U.S. Pat. No. 3,889,758; JP49-39800; SU878318; SU1082443).

All of these fire extinguishers utilize the same method of powder ejection. An ignitor ignites a gunpowder charge. During combustion of this charge, a gas is formed inside the body between the bottom and the piston, which presses against the piston. Majority of the force exerted onto the piston is transferred to the powder, and further to the cover (partition) installed in the outlet opening of the body.

A disadvantage of the known fire extinguishers is their low efficiency and complex design.

A manual fire extinguisher is known, which contains a fire extinguishing substance in the form of a powder and comprises a hollow cylindrical body having a bottom, a piston installed inside the body and intended for ejecting the powder through the outlet opening of the body, a pyrotechnic charge with an ignitor located inside the body cavity between the bottom and the piston, and a channel connecting the body cavity between the bottom and the piston with the atmosphere. (SU1648509, 1988).

The disadvantage of the known fire extinguisher is the low fire extinguishing capability, which is explained by a small amount of the powder charge, small opening angle of the powder jet, and non-uniform distribution of the powder within the powder cloud. For such known fire extinguisher, there is a maximum amount of powder and a maximum length of the powder column inside the body, which cannot be increased without changing the ejection method and design of the fire extinguisher.

Powder fire extinguishers, such as type OP-1, OP-2, OP-5, etc. are known (see N. V. Isavin, Powder Extinguishing Media, Stroyizdat, Moscow (1983), p. 149), comprising a body with a fire extinguisher powder, a valve, a spray nozzle, and a gas source in the form of a compressed gas cylinder or a pyrotechnic gas generator. When such fire extinguishers are activated, the gas source creates pressure inside the body, causing the powder to be sprayed through the spray nozzles in the form of a gas-powder jet.

The disadvantage of such powder fire extinguishers is the low intensity of supplying the fire extinguishing powder per unit area of the fire zone and small range of coverage limited to 1.5-3 meters. This reduces the possibility of extinguishing fires using devices of this type in those cases, for example, when the accessible distance to fire exceeds the coverage range of the fire extinguisher.

Pulse powder fire extinguishers (flame suppressors) are known, which utilize a barrel-projecting principle for delivering fire extinguishing powder to the source of fire. The range of coverage of the devices of such type increases to 10 meters and more. In such fire extinguishers, the source of compressed gas is a pyrotechnic charge, the combustion products of which are responsible for ejecting the powder from the body, which acts as a barrel during ejection. A number of well-known designs of pulsed powder fire extinguishers are described in a review by A. V. Golotaistrov et al., Powder Flame Suppressors, NIITEKHIM, Moscow (1988), Safety series.

A powder mini-fire extinguisher "Malysh" is known (Technical specification IBYAG 634233. 002 TU, GPO "Metalist," Chapaevsk (1992)), which is designed to extinguish fires in the above cases.

This fire extinguisher comprises a body, a fire extinguishing powder, a piston, a propulsive charge, and an igniter head. Black gunpowder is used as a propulsive charge.

The disadvantages of the fire extinguisher of such design include a significant recoil force, occurring upon activation thereof due to an abrupt increase in pressure during combustion of the propulsive charge, and resultant insufficient spraying of the fire extinguishing powder at the fire front, which significantly reduces its real fire extinguishing ability. In addition, the effect from using such pulse devices similar to the "Malysh" class mini-fire extinguishers is achieved when extinguishing fire from a distance of 1-2 m. In case of a greater distance (e.g., 4-5 m), such devices already become ineffective, since the method of initiating a propulsive charge using a friction igniter, high recoil force during operation of the fire extinguisher, and strong accompanying sound effect make it difficult to aim.

The closest to the proposed invention is a known pulse powder fire extinguisher (SU1151245, publication date: Apr. 23, 1985; bulletin No. 15), which comprises a cylindrical body with a bottom filled with a fire extinguishing powder, a unit containing a pyrotechnic charge and an igniter located in the bottom and separated from the powder by a piston, a wad and a cover, which seals the body from the open end side. The cover may have a different shape and design.

The disadvantage of such design is the low fire extinguishing efficiency due to poor spraying (dispersion) of the powder over the source of fire, since the powder charge is ejected over a long range as a practically compact mass. This makes it difficult to block the source of fire with the powder flow in case of slight deviations in aiming. In addition, as a result of storage, the fire extinguishing powder becomes caked, which leads to the same result.

In case of highly flammable liquids, even a small portion of the flame not extinguished by the flow of powder will lead to re-ignition.

Utility Model Disclosure

The proposed technical solution is based on the objective to create an economical powder mini-fire extinguisher with low recoil force and high fire extinguishing ability.

This objective is achieved by the fact that according to a utility model, in a compact powder fire extinguishing device, comprising a container filled with a fire extinguishing powder, means that generate a propulsive charge while being separated from the powder by a piston, a wad, and a cover sealing the container from the open end side, said container with the fire extinguishing powder is made in the form of a single-use cartridge, said cartridge being separable from the fire extinguishing device by means of a reusable fast-action firing device, said fire extinguishing powder being disposed inside the cartridge casing in a polymer tube, one end of which is circumferentially fastened at an outlet of the cartridge casing, and the second end of the tube abuts a sleeve and is configured as a piston having an aperture, wherein there is a coin-like sealing disc mounted on the inner side of the piston opposite to the aperture, while the wad is configured as a polyhedron with a pointed central part and fins; furthermore, the means that generate the propulsive charge are placed within the casing of the cartridge and are configured as an initiator (a striker-type igniter-percussion cap) and a pyrotechnic gas generator disposed one after the other, said gas generator being connected to the cavity of the sleeve, and the other end of the cartridge is provided with a contoured surface and is connected to the firing device, which comprises a mechanism for fastening and discharging the cartridge, containing a collar having flat curved clamping springs located around the circumference of the collar and a trigger mechanism having a head installed with the possibility of free movement inside the aperture of the end wall of the cylindrical support and a flat striking spring with a striker, which is in contact with a sear, said spring being fixed to cylindrical brackets integrated with a rod, and a hammer connected with a trigger and a safety catch being attached to said brackets.

The presence of a reusable firing device having a handle, a trigger, and a safety catch, as provided for by this technical solution, allows the operator to firmly hold the fire extinguishing device with both hands by the cartridge casing and handle at the time of its activation and, thereby, provide more targeted delivery of the fire extinguishing powder to the ignition zone. The design of the firing device allows reloading with a new fire extinguishing cartridge and ejecting the fire extinguishing powder for 6-7 seconds when extinguishing fire. An increase in the number of targeted deliveries of the fire extinguishing powder to the fire zone per unit of time eventually leads to a synergistic effect, i.e., an improved performance of the device due to integration of individual fire extinguishing effects (fire extinguishing powder, high accuracy of its delivery to the fire zone, higher frequency of such deliveries) into a single system due to the systemic effect. The stability of operation of the device is achieved by reducing the recoil force, occurring upon activation of the device, increasing an opening angle of the powder jet, as well as increasing the uniformity of powder distribution within the cloud covering the fire, which improves the fire extinguishing capability of the device. The use of a polymer tube as a piston allows solving the problem of sealing the fire extinguishing powder during storage, eliminates caking of the powder and its negative effect on the cartridge casing. In addition, due to the design of the cartridge having a polymer tube circumferentially attached thereto from the side of the cover, the expanding gunpowder gases force this polymer sleeve to turn inside out and carry out the entire amount of the fire extinguishing powder in a pulsed manner outside of the cartridge casing, thereby increasing the opening angle of the powder jet and the fire source coverage area, which also improves the fire extinguishing capability of the device.

The cartridge is easy to use, inexpensive to manufacture, and it can be filled with any powder-like substance necessary for the intended purpose.

The design of the proposed fire extinguishing device is quite compact, convenient, and economical to operate. All elastic elements (flat springs) of the device are in a free state and become engaged only upon activation of the device, which significantly extends their service life. The mechanisms of the firing device do not require lubrication with technical oils due to a low friction coefficient during operation.

Provided below is a description of a specific embodiment of the utility model with the reference to the attached drawings.

FIG. 1 schematically shows a general view of the compact powder fire extinguishing device ("Spas") produced in accordance with this utility model, General view;

Figure 1:
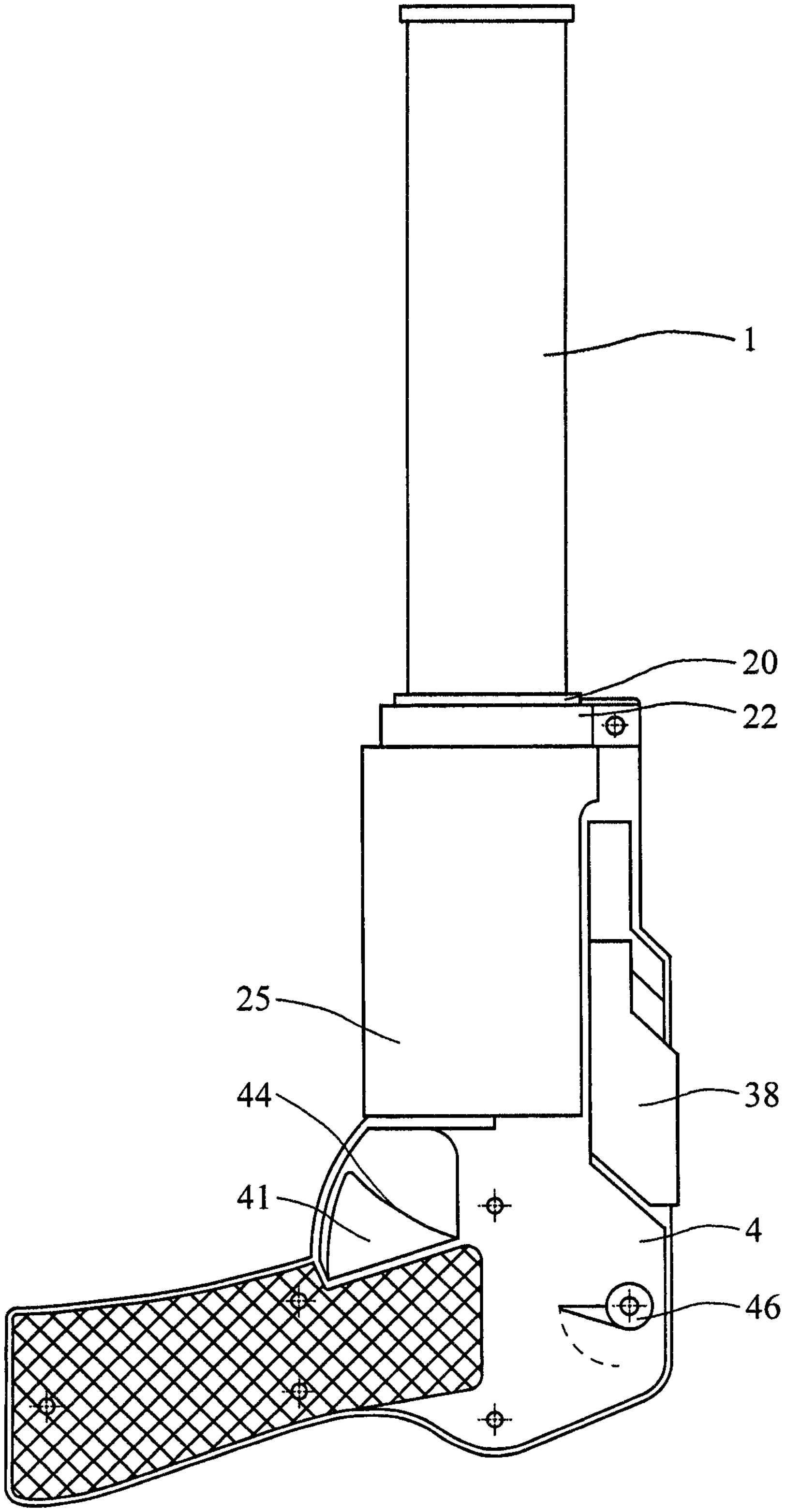
Figure 2:
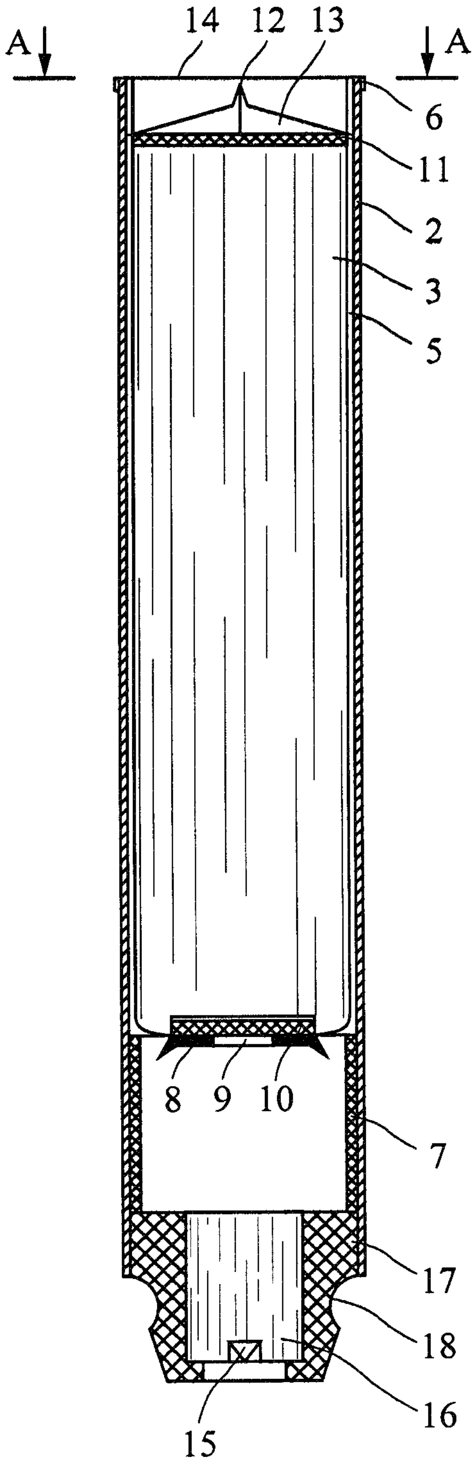
FIG. 2 shows a longitudinal cross-section of the cartridge with the means for generating a propulsive charge.
Figure 3:
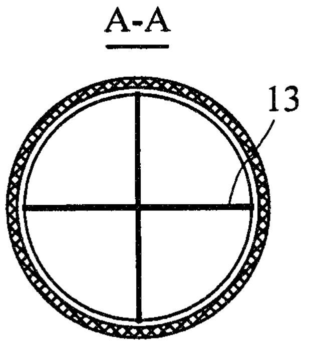
FIG. 3 shows cross-section (A-A) from FIG. 2.
Figure 4:
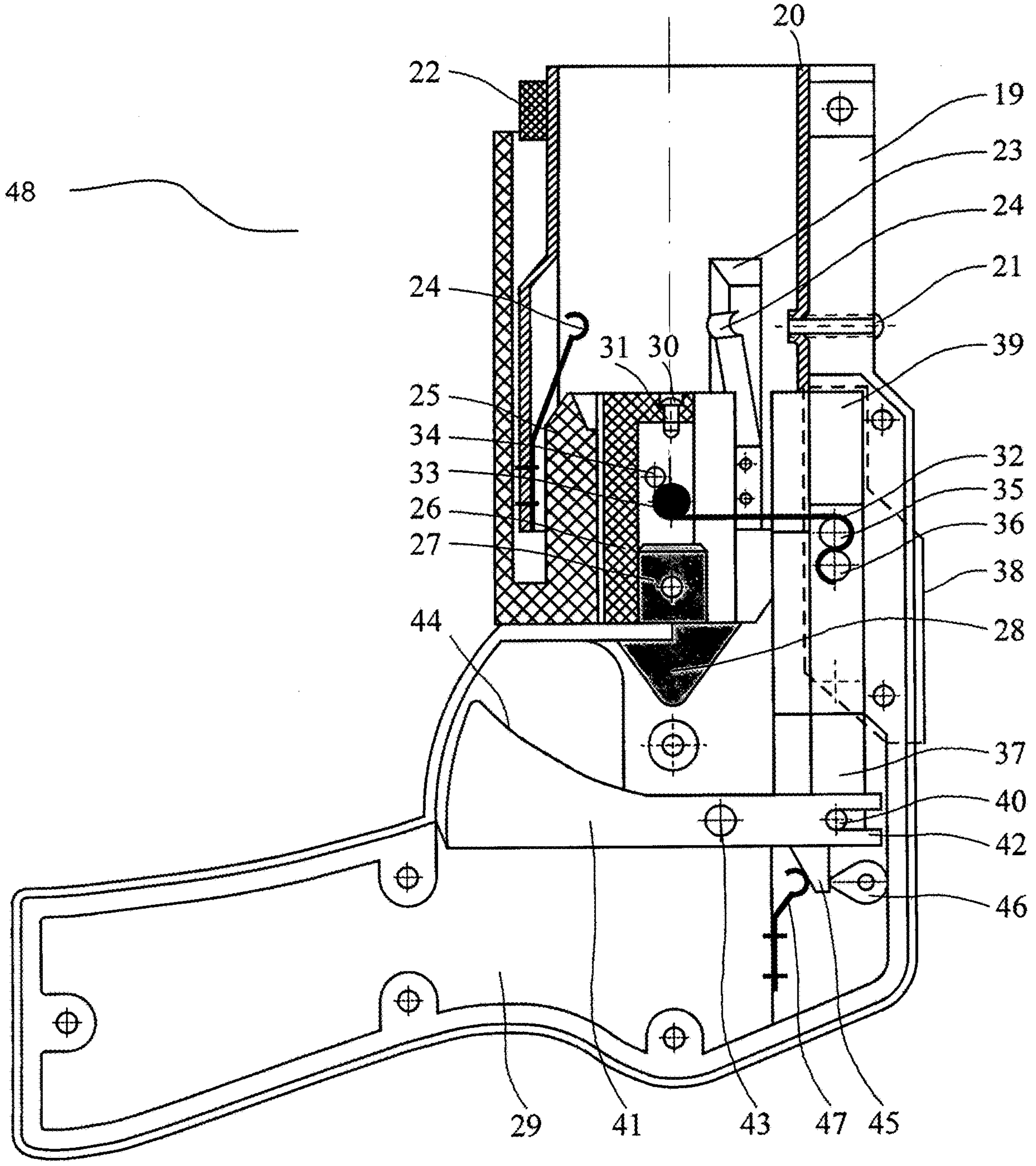

FIG. 4 schematically shows a longitudinal cross-section of the firing device.

PREFERRED EMBODIMENT OF THE UTILITY MODEL

The compact powder fire extinguishing device ("Spas") made in accordance with this utility model comprises a single-use cartridge 1 made in the form of a cylindrical container, including a casing 2 with a fire extinguishing powder 3 and a reusable fast-action firing device 4 for fastening and discharging cartridge 1, and a trigger mechanism 48. Fire extinguishing powder 3 is contained within casing 2 of the cartridge 1 in a polymer tube 5, one end 6 of which is circumferentially fastened to the outlet of the casing 2 of the cartridge 1, and the second end of tube 5, which abuts a sleeve 7, is configured as a piston 8 having an aperture 9.

On the inner side of piston 8, across from aperture 9, a coin-like sealing disc 10 is attached. At the output of casing 2 of the cartridge 1, there is a wad 11 configured as a polyhedron with a pointed central part 12 and fins 13. At the end of casing 2 of the cartridge 1, a cover 14 is attached. Cartridge 1 is provided with the means that generate a propulsive charge, which include an initiator (a striker-type igniter-percussion cap 15) and a pyrotechnic gas generator 16 disposed one after the other, said gas generator being connected with the cavity of sleeve 7. As a special case, the housing of the gas generator 16 is encased with a polymeric material 17 to form a contoured surface 18 at the end thereof. Firing device 4 contains a mechanism for fastening and discharging cartridge 1. The mechanism for fastening and discharging cartridge 1 is mounted on the front part of a body 19 of the firing device 4 configured as a pistol having a collar 20 attached to the body 19 with a screw 21 and a clamping ring 22. Collar 20 has three profiled niches 23 located around the circumference of the collar at an angle of 120°, in which three flat curved clamping springs 24 are installed. The mechanism for fastening and discharging cartridge 1 is provided with a puller 25 configured to move along a cylindrical support 26, mounted on a cylindrical bracket 27, supported by an unloading cone 28 of the body 19. Firing device 4 also comprises a hammer-and-trigger mechanism 48, which is located in the middle portion of the body 19 and its handle 29. The trigger mechanism 48 comprises a head 30 configured to move freely within aperture 31 of the end wall of the cylindrical support 26, a flat striking spring 32 with a striker 33, which is in contact with a sear 34. Spring 32 is mounted to cylindrical brackets 35 and 36 integrated with a rod 37, to which a hammer 38 is attached. Rod 37 is placed inside a guiding groove 39 of the body 19 and has a pin 40, which is kinematically connected with a trigger 41 via an eye 42 located at the top of the trigger 41. Trigger 41 has an axis 43 and a pad 44. In the top part of trigger 41 there is also a second pad 45 for interacting with the cam of a safety catch 46 and a spring loader 47.

A compact powder fire extinguishing device ("Spas") operates as follows.

To activate the device, cartridge 1 should be inserted into the collar 20 of the trigger mechanism 48 of the firing device 4 until it stops, and the contoured surface 18 of the casing 2 of the cartridge 1 engages with the heads of three flat curved clamping springs 24 located on the collar 20 around the circumference at an angle of 120° between each other. Next, safety catch must be rotated counterclockwise toward the operator to make the device ready to fire. To ensure an accurate shot of the fire extinguishing powder, it is necessary to hold the casing 2 of the cartridge 1 from the bottom with the left hand, put the index finger on the pad 44 of the trigger 41, aim at the front of the ignition source and press on the pad 44 of the trigger 41. The fire extinguishing powder 3 will be abruptly ejected onto the ignition source.

When pad 44 is pressed, trigger 41 starts rotating around the axis 43, transmitting its movement via eye 42 at the top thereof and pin 40 to the rod 37, which moves progressively inside groove 39 of the body 19 of the mechanism and will move the fixed part of the flat striking spring 32 with hammer 33. Hammer 33, while being in contact with sear 34, moves around the cylindrical surface of the sear 34 and, after sliding away from the sear 34, hits striker 30 with great force, which causes the igniter-percussion cup 15 to break. Upon receiving an impact pulse, igniter-percussion cup 15 activates the pyrotechnic gas generator 16, the generated expanding gas presses on the piston 8, a reduced diameter of which makes it possible for said piston to move freely inside the polymer tube 5, gradually turning it inside out. While moving inside the tube 5, piston 8 pushes the fire extinguishing powder 3 toward the outlet, and wad 11 cuts through the cover 14 with its pointed central part 12 and fins 13. Fire extinguishing powder 3 starts moving outward. Tube 5 is turned inside out due to the fact that its output part from the side of the cover 14 is circumferentially fastened to casing 2 of the cartridge 1. After the polymer tube 5 is completely turned inside out and piston 8 exits from casing 2 of the cartridge 1, the coin-like sealing disc 10 flies away and opens the aperture 9 in piston 8, so that gunpowder gases can escape outside. Next, trigger 41 is released and hammer 38 is moved towards the operator to bring back rod 37, which moves back with it the supporting part of the flat striking spring 32 with hammer 33. Flat striking spring 32 moves around sear 34 with the back side of hammer 33, deflects in the clockwise direction due to free rotation of the supporting part on cylindrical bracket 35, and returns to its original position. Flat spring 47 acts as a loader and simulates the load when cocking the hammer 38.

In the case of a single shot, the safety catch 46 is activated by moving it away from the operator. If several shots are required in a row, safety catch 46 does not have to be activated. To ensure quick reloading of the device, it is necessary to grab onto the puller 25 with the left hand and sharply move it away to release spent cartridge 1 (puller 25 will return to its original position when freed and released). If it is necessary to continue fire extinguishing, the next cartridge is removed from the storage module (case, container, cartridge belt, etc.) (not shown in the drawings) and loaded in the same manner. To do this, it is necessary to pull hammer 38 toward the operator and repeat the whole cycle: the process can be repeated multiple times. The number of shootings will be controlled by the test results, i.e., by the established service life of the trigger mechanism. The estimated recharge time of the device will be 6-7 seconds. Therefore, such device can be qualified as a reusable pulse device operating with 6-7 second pulses.

Thus, the firing device combines the performance of the following several functions:

- fastening the fire extinguishing cartridge and discharging it after spending;
- performing cartridge ejection and returning the flat striking spring to its original position;
- ensuring operator safety by activating a safety catch.

Collar 20 of the trigger mechanism can be made from an aluminum sheet by using deep drawing with subsequent profiling. The rest of the main parts are made of polyurethane characterized by high strength, temperature stability, durability, low friction coefficient, etc.

The use of the proposed design of a compact fire extinguishing device will allow:

- improving the device performance due to high accuracy and frequency of delivering the extinguishing powder to the fire zone;
- minimizing operator's exposure to pulse loads;
- providing high efficiency, reliability, and durability due to the fact that the device mechanisms do not require lubrication with technical oils, have a rather low friction coefficient, and all the elastic elements (flat springs) of the device are stored in a free state and become engaged only upon activation of the device, which significantly extends their service life;
- ensuring light weight, compactness, and low cost to make it possible for the operator to acquire (and constantly replenish) several fire extinguishing cartridges for various purposes in a set with one firing device. This will provide the operator with an opportunity to only use the required and sufficient amount of fire extinguishing powder.

INDUSTRIAL APPLICABILITY

The proposed device can be used most successfully to extinguish local fires in the initial phase of combustion of solid, liquid, and gaseous substances, electrical installations under a voltage up to 1000 V, television and radio equipment indoors and in the open areas using fire extinguishing powder from a safe distance. The device can be used on the automobile, rail, and other types of transport, at manufacturing sites and at home. The device can be placed inside the railway car compartments, ship cabins, vehicles, and used at the fire stations of the shops of industrial enterprises, at gas stations, etc. The device can be used as a primary fire extinguishing means by the employees of the fire departments, police, civil defense, military personnel, welders, rescuers, and tourist groups.

The invention claimed is:

1. A compact powder fire extinguishing device comprising

- a container filled with a fire extinguishing powder (3),
- means that generate a propulsive charge while being separated from the powder (3) by a piston (8),
- a wad (11) and a cover (14) sealing the container from an open end side,
- WHEREIN, said container with the fire extinguishing powder is made in the form of a single-use cartridge (1),
- said cartridge being separable from the fire extinguishing device by means of a reusable fast-action firing device (4), said fire extinguishing powder (3) being disposed inside a casing (2) of the cartridge (1) in a polymer tube (5), one end (6) of the tube is circumferentially fastened at an outlet of the casing (2) of the cartridge (1), and a second end of the tube (5) abuts a sleeve (7), said sleeve containing the piston (8) and said piston comprising an aperture (9), WHEREIN, a coin-shaped sealing disc (10) is mounted on the inside of the piston (8) opposite the aperture (9), said wad (11) is configured as a polyhedron with a pointed central part (12) and fins (13);

said means that generate the propulsive charge are placed within the casing (2) of the cartridge (1) and are configured as an initiator in the form of a striker-type igniter-percussion cap (15) and an adjacent pyrotechnic gas generator (16), said gas generator being connected to a cavity of the sleeve (7), and WHEREIN, one side of the cartridge (1) is connected to the firing device (4), and is provided with a contoured surface (18)

said firing device comprising a mechanism for fastening and discharging the cartridge that contains a collar (20) with flat curved clamping springs (24) located around the circumference of the collar (20) and a trigger mechanism (48), said trigger mechanism comprising a head (30) installed inside an aperture of an end wall of a cylindrical support (26), said head being freely moveable inside the aperture, (26)

a flat striking spring (32) with a striker (33), which is in contact with a sear (34), said spring (32) being fixed to cylindrical brackets (35) and (36) integrated with a rod (37), a hammer (38) attached to the rod that connects with a trigger (41) and a safety catch (46).

* * * * *